US009449778B2

(12) United States Patent
Durth

(10) Patent No.: US 9,449,778 B2
(45) Date of Patent: Sep. 20, 2016

(54) COMBINED SURGE PROTECTION DEVICE WITH INTEGRATED SPARK GAP

(71) Applicant: PHOENIX CONTACT GMBH & CO. KG, Blomberg (DE)

(72) Inventor: Rainer Durth, Horn-Bad Meinberg (DE)

(73) Assignee: PHOENIX CONTACT GMBH & CO. KG (DE)

( * ) Notice: Subject to any disclaimer, the term of this patent is extended or adjusted under 35 U.S.C. 154(b) by 0 days.

(21) Appl. No.: 14/812,031

(22) Filed: Jul. 29, 2015

(65) Prior Publication Data

US 2016/0035529 A1 Feb. 4, 2016

(30) Foreign Application Priority Data

Aug. 4, 2014 (DE) ........................ 10 2014 215 280

(51) Int. Cl.
*H02H 1/00* (2006.01)
*H01H 85/44* (2006.01)
(Continued)

(52) U.S. Cl.
CPC ................ *H01H 85/44* (2013.01); *H01C 7/10* (2013.01); *H01H 85/055* (2013.01); *H01H 85/143* (2013.01); *H01H 85/20* (2013.01); *H01T 1/14* (2013.01); *H01T 4/12* (2013.01)

(58) Field of Classification Search
CPC .... H01H 85/20; H01H 85/44; H01H 85/055; H01C 7/10; H01T 1/14
USPC .......................................................... 361/124
See application file for complete search history.

(56) References Cited

U.S. PATENT DOCUMENTS

2012/0243138 A1* 9/2012 Cerny .................... H02H 9/041 361/93.8
2015/0207308 A1* 7/2015 Buhler ...................... H01T 2/02 361/117
2016/0013631 A1* 1/2016 Ehrler ...................... H02H 9/04 361/91.1

FOREIGN PATENT DOCUMENTS

DE 195 45 505 C1 12/1995
DE 10 2011 053 415 A1 9/2011
DE 20 2013 002 222 U1 3/2013

OTHER PUBLICATIONS

German Search Report prepared by the German Patent Office on Apr. 27, 2015, for German Patent Application No. 10 2014 215 280.

*Primary Examiner* — Dharti Patel
(74) *Attorney, Agent, or Firm* — Sheridan Ross P.C.

(57) ABSTRACT

The object of the invention is a combined surge protection device with an integrated spark gap and with a fuse connected in series thereto, wherein the spark gap has two main electrodes and one auxiliary ignition electrode, having a housing with a first connector and a second connector, with the first connector being electrically connected to the fuse, and with the second connector being electrically connected to the first main electrode of the spark gap, and with the second main electrode of the spark gap being electrically connected to the fuse on the interior of the housing, with the combined surge protection device also having an auxiliary fuse element that is connected electrically on one side to the first connector, and with the auxiliary fuse element being connected on the other side via an ignition circuit, which is arranged on the interior of the housing, to the auxiliary ignition electrode, with the combined surge protection device having another connector in the region of the auxiliary fuse element that can be contacted at substantially the same potential to the first main electrode, so that, in the case of overloading, an electric arc forms between the auxiliary fuse element and the other connector, which leads to the triggering of the fuse.

11 Claims, 4 Drawing Sheets

(51) Int. Cl.

| | |
|---|---|
| ***H01T 1/14*** | (2006.01) |
| ***H01T 4/12*** | (2006.01) |
| ***H01C 7/10*** | (2006.01) |
| ***H01H 85/055*** | (2006.01) |
| ***H01H 85/143*** | (2006.01) |
| ***H01H 85/20*** | (2006.01) |
| *H02H 3/20* | (2006.01) |
| *H02H 9/04* | (2006.01) |
| *H02H 1/04* | (2006.01) |

COMBINED SURGE PROTECTION DEVICE WITH INTEGRATED SPARK GAP

CROSS-REFERENCE TO RELATED APPLICATIONS

This application claims the benefit of German Patent Application No. 102014215280.1 filed on Aug. 4, 2014, the entire contents of which are incorporated herein by reference.

The invention relates to a combined surge protection device with an integrated spark gap.

Many electrical devices and electrical lines are protected by fuses in case of faults. The faults that can occur vary greatly in terms of type. The most common faults can be understood as being overload or short-circuit faults.

Typically, a fuse can then be triggered. When that occurs, the current flowing through the fuse heats the fuse element to the point that a partial or even complete fusing of the fuse element occurs. As a rule, this fusing is associated with the occurrence of an electric arc which vaporizes the material of the fuse element. This vapor precipitates elsewhere, and the electric arc is cooled to the point that the current is limited and finally switched off.

The fusing of the fuse element is determined by its material and geometric characteristics, so that a respective heat quantity Q is required to vaporize the fuse element depending on the material and/or geometry of the fuse element. Typically, the fusing characteristics and associated rated breaking capacity are described by the melting integral $I^2t$.

It must be taken into account, however, that this current, which represents a fault case, nonetheless flows through the device or system to be protected.

Particularly in the case of high short-circuit currents, the danger thus exists of damage that should actually be prevented, since the power limit of the device to be protected is exceeded.

What is more, it must be considered that current is flowing not only in the phase in which the fuse element fuses, but also in the quenching phase.

In other words, only the integration of the two areas of current flow leads to the clearing integral.

This clearing integral must therefore be taken into account during dimensioning in order to prevent damage.

However, this is frequently wrongly neglected, resulting in faulty dimensions.

There are special requirements in the event that the device to be protected is a surge protection device, as these are intended to briefly allow high levels of current to pass through without the fuse being triggered but switch off early on during low, lingering fault currents such as those that can occur, for example, as a result of damage to the surge protection device or as mains follow current. While the former requirement often leads to high rated current values of the fuse, the latter requirement can only be sensibly met with low nominal current values.

At the same time, there is an ever-increasing trend toward smaller installation spaces. Existing fuses are therefore incompatible with these requirements.

It is thus the object of the invention to provide a space-saving, efficient and cost-effective combination of surge protection and safety devices.

This object is achieved according to the invention by the features of the independent claims. Advantageous embodiments of the invention are described in the subclaims.

BRIEF DESCRIPTION OF THE DRAWINGS

The invention is explained in further detail below on the basis of preferred embodiments with reference to the enclosed drawing.

FIGS. 1, 2 and 4 each show a schematic representation of a combined surge protection device according to the invention with an integrated spark gap.

Figure 1:
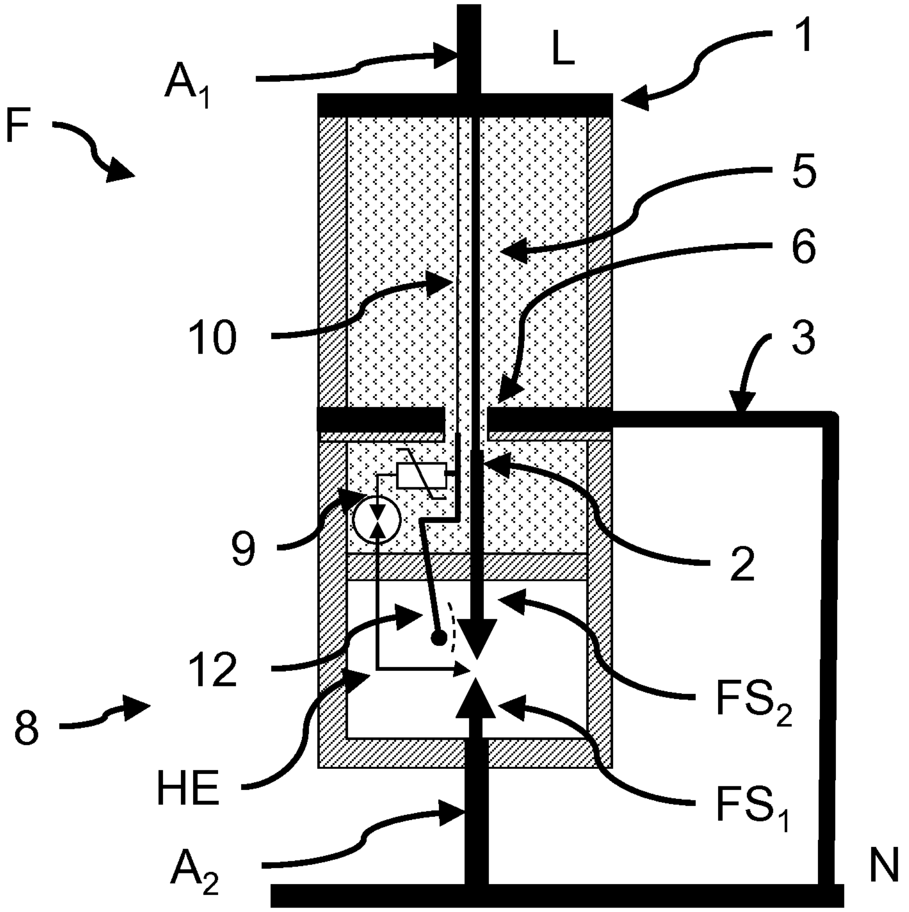
FIG. 1 shows a first embodiment of a combined surge protection device according to the invention with an integrated spark gap.

The combined surge protection device according to the invention has an integrated spark gap 8 and a fuse 5 connected in series thereto. The spark gap has at least two main electrodes $FS_1$, $FS_2$ and an auxiliary ignition electrode HE.

The two devices spark gap 8 and fuse 5 are integrated into a housing. The housing has a first connector $A_1$ and a second connector $A_2$, the first connector $A_1$ being electrically connected to the fuse 5, and the second connector $A_2$ being electrically connected to the first main electrode $FS_1$ of the spark gap 8. On the interior of the housing, the second main electrode $FS_2$ of the spark gap 8 is electrically connected—e.g., via an internal contact 2—to the fuse 5 on the interior of the housing.

The combined surge protection device also has an auxiliary fuse element 10 that is connected electrically on one side to the first connector $A_1$ and on the other side via an ignition circuit 9, which is arranged on the interior of the housing, to the auxiliary ignition electrode HE.

During operation, the first connector $A_1$ is directly connected to the first potential L, and the spark gap 8 is connected directly to the second potential N via the second connector $A_2$.

Another connector 3 is located in the region of the auxiliary fuse element 10 that can be contacted at substantially the same potential to the first main electrode $FS_1$, so that, in the case of overloading, the auxiliary fuse element 10 disconnects, and the resulting electric arc between the ends of the fuse element 10 leads to an ionization in the region of the connector 3.

As a result, the electric arc commutates with the base point to the (lower-impedance) other contact 3, which is connected directly to the (lower) second potential N, whereby the electric arc burns between the contact 3 and the end of the auxiliary fuse element 10 that is connected to the (higher) first potential L.

Depending on the level of the resulting short-circuit current, the electric arc either burns off the auxiliary fuse element 10 gradually (in the direction of the higher first potential L) or [the fuse element] is vaporized all at once over its entire length. Both processes ultimately lead to the switching off of the current in accordance with the function and capacity of fuses.

The region around the other contact 3 is preferably dimensioned such that the ionization of the burning auxiliary fuse element 10 leads practically unavoidably to another powerful electric arc between the fuse element 5 and the (lower-impedance) other contact 3, which is connected directly to the (lower) second potential N. Depending on the level of the resulting short-circuit current, the electric arc either burns off the auxiliary fuse element 10 gradually in the direction of the (higher) first potential L, or the fuse element 5 is vaporized all at once over its entire length. Both processes ultimately lead to the switching off of the current in accordance with the function and capacity of fuses.

Upon overloading of the fuse element 5, for example due to overload currents or short-circuit currents, the fuse element 5 becomes separated and an electric arc is formed that initially burns between the two ends of the fuse element 5. Under the effect of the electric arc, the separated ends of the fuse element 5 now gradually burn off, and the electric arc lengthens. As a result of the ionization caused by the electric arc, the other contact 3 becomes the (new) base point of the electric arc if that has not already occurred.

The flow of current through the device 8 to be protected is thus interrupted. This ensures that, in the case of a fault, the device 8 to be protected need only carry the energy corresponding to $i^2t$ required for fusing and the development of the first electric arc. This energy is substantially lower than the energy that would flow through the device until the fuse is blown (clearing integral).

This results in a substantial unburdening of the secured power circuit.

In an advantageous embodiment, the fuse element 5 and/or the auxiliary fuse element 10 has a predetermined breaking point 6 in the region of the other contact 3.

In the case of a short circuit in the electrical device to be protected, the fuse element 5 will now fuse in the region of the predetermined breaking point 6. An electric arc is produced and, in turn, the electric arc burns off the two ends of the fuse element 5, thus lengthening. In the region in which the contact 3 approaches the fuse element 5, ionization occurs as a result of the electric arc, whereby the electric arc, as the new base point, can select the contact 3 or become the second contact in a relative sense due to the low resistance (e.g., with appropriate dimensioning) and/or arrangement. The flow of current through the device 8 to be protected is thus interrupted. This ensures that, in the event of a fault, the device 8 to be protected need only carry the energy corresponding to $i^2t$ required for the fusing of the predetermined breaking point 6 and the development of the first electric arc. This energy is substantially lower than the energy that would flow through the device until the fuse is blown (clearing integral).

Especially preferably, a provision can additionally be made that the fuse element 5 and/or the auxiliary fuse element 10 and/or the ignition circuit 9 is filled with an extinguishing medium, particularly with sand and/or POM. As a result, the switching characteristics are improved in terms of switching capability and speed, since improved cooling of the electric arc is now being provided, whereby the switching capability and speed can be improved [sic].

Figure 2:
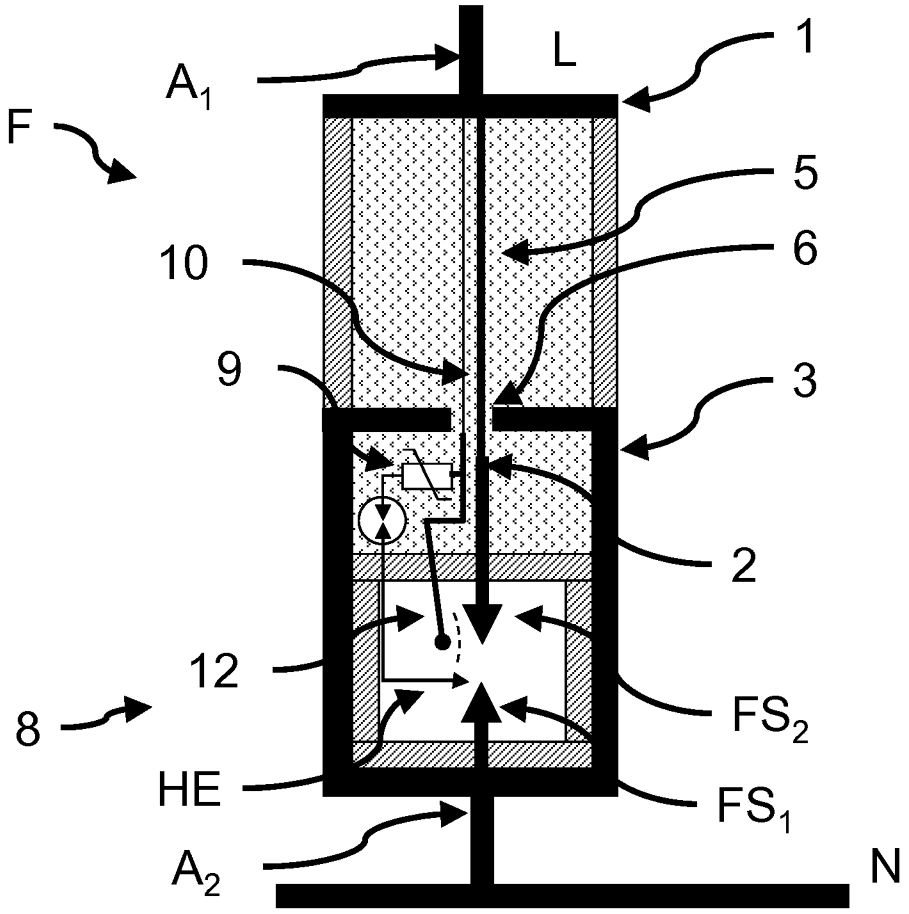
FIG. 2 shows a second embodiment of a combined surge protection device according to the invention with an integrated spark gap.
Figure 4:
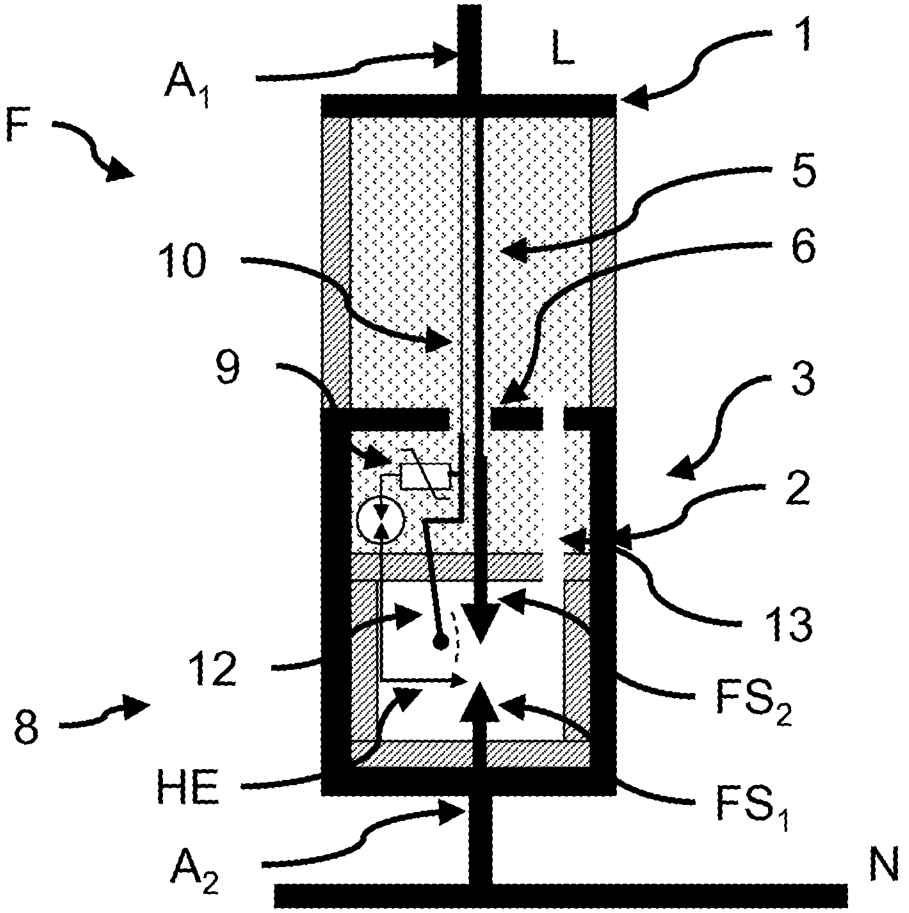
FIG. 4 shows a third embodiment of a combined surge protection device according to the invention with an integrated spark gap.

The combined surge protection device can be manufactured in an especially cost-effective manner if, as shown in FIGS. 2 and 4, at least parts of the housing make available the potential-equivalent connection of the other connector 3 and first main electrode $FS_1$. This can be done, for example, by means of an appropriately conductive sub-housing.

An especially expedient embodiment can be achieved if the combined surge protection device has a gas discharge tube and a varistor connected in series thereto in the ignition circuit 9, as indicated schematically in FIGS. 1, 2 and 4. This enables early ignition of the spark gap to be achieved.

Moreover, a provision can also be made that, alternatively or in addition to the ignition circuit 9 described above, the auxiliary fuse element 10 also has a wear monitoring device 12.

The wear monitoring device 12 can be embodied as a contact protected by a degradable material, for example.

That is, if an ignition circuit 9 and wear monitoring device 12 are provided, the spark gap 8 can be separated completely from the grid both through the overloading of the ignition circuit 9 and through the overloading of the spark gap 8 on its interior through triggering of the auxiliary fuse element 10 and subsequent burning-off of the main fuse element 5.

It can also be advantageous if at least the spark gap 8 is enclosed in a substantially pressure-resistant manner. As a result, damage to surrounding systems can be prevented in the case of a fault.

For example, a provision can be made in this regard for a pressure equalization channel 13, for example, that enables pressure equalization within the housing. In this way, hot plasma is able to escape from the combustion chamber without the function of the fuse element being necessarily impaired as a result. For example, the plasma flow can be conducted into an extinguishing medium, thus resulting in cooling.

Alternatively or in addition, however, a provision can also be made that strong plasma and hence pressure development also acts in a targeted manner through the pressure equalization channel 13 on the fuse element 5 and/or the auxiliary fuse element 10 in order to thus make another triggering option available, for example.

However, another form of triggering can also readily be provided through the provision of a contact means that can selectively connect the other connector 3 and the auxiliary fuse element 10 and/or the fuse element 5 electrically in order to bring about an electric arc. That is, external triggering is thus also made possible, for example by means of an electrically conductive pin or the like, by selectively establishing an electrical connection.

As regards the structure of the fuse element 5 and of the auxiliary fuse element 10, different embodiments can be provided. For instance, as shown in FIGS. 1, 2 and 4, the fuse element 5 and the auxiliary fuse element can be guided in the manner of a wire so as to be parallel at least in sections or, as shown on the left side in FIG. 3, the auxiliary fuse element 10 can be separated in sections from the fuse element 5 as a part. For example, the auxiliary fuse element 10 can be appropriately separated in sections from the fuse element 5 through punching, severing, milling or the like.

Figure 3:
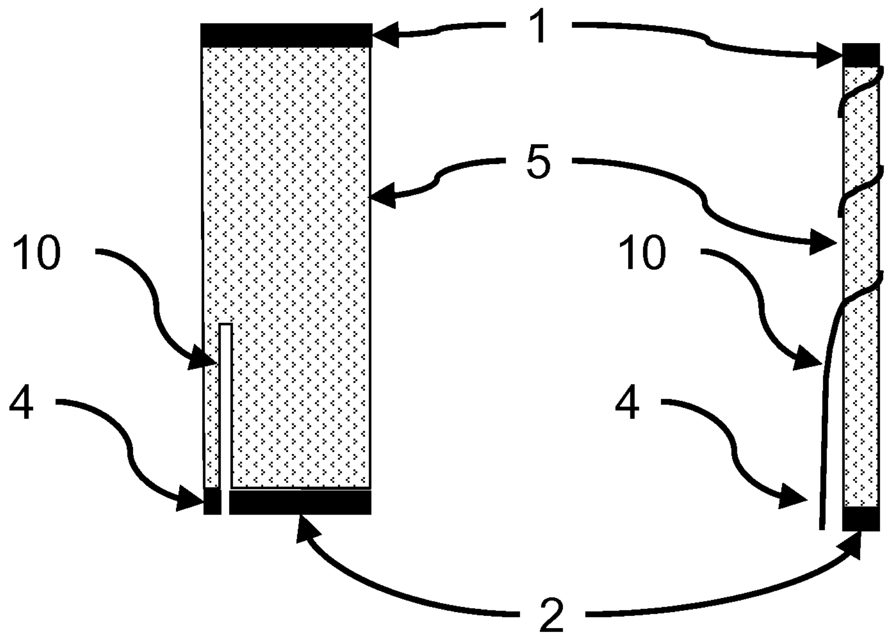
FIG. 3 shows details in relation to embodiments of the invention.

Or, as shown to the right in FIG. 3, the auxiliary fuse element 10 can also enclose the fuse element 5 in sections in the manner of a coil.

The intention is for the auxiliary fuse element 10 to run so as to be isolated from the fuse element 5 at least in the region in which the contact 3 approaches the fuse element 5, thus resulting in a substantially defined ignition point.

Through an appropriate embodiment of the other contact 3 and of the fuse element 5 or of the auxiliary fuse element 10, the intermediate space can be embodied such that independent ignition occurs at a certain voltage, e.g., in the event of overvoltage. In that case, the intermediate space and the other contact 3 and the fuse element 5 or the auxiliary fuse element 10 constitute a second spark gap. Since this process is irreversible, the intermediate space is embodied such that the specified voltage is higher, generally even substantially higher, than the ignition voltage of the spark gap via the main electrodes $FS_1$ and $FS_2$. In this regard, this embodiment introduces what is in effect a second level of security.

In addition, the fuse element 5 and the auxiliary fuse element 10 can have one or more predetermined breaking points 6 in the region of the other contact 3 or in the region of the fourth contact 4.

The usual mechanisms for the insulated execution of potentials can be used for the insertion of the insulated potentials of the other contact 3. A layered construction of metal plates and insulating plates closed off with a securing end plate is especially advantageous. In this design, the various potentials can be inserted via the stacked, mutually insulated plates. The stack of plates can be screwed together, for example.

The triggering of the fuse can be signaled using the usual mechanisms.

LIST OF REFERENCE SYMBOLS

| | |
|---|---|
| connector | $A_1$, $A_2$ |
| main electrode | $FS_1$, $FS_2$ |
| auxiliary electrode | HE |
| fuse | F |
| first contact | 1 |
| second contact | 2 |
| other contact | 3 |
| fuse element | 5 |
| predetermined breaking point | 6 |
| spark gap | 8 |
| ignition circuit | 9 |
| auxiliary fuse element | 10 |
| wear monitoring device | 12 |
| first potential | L |
| second potential | N |
| pressure equalization channel | 13 |

What is claimed is:

1. A combined surge protection device with an integrated spark gap and with a fuse connected in series thereto, wherein the spark gap has two main electrodes and one auxiliary ignition electrode, having a housing with a first connector and a second connector, with the first connector being electrically connected to the fuse, and the second connector being electrically connected to the first main electrode ($FS_1$) of the spark gap, and with the second main electrode of the spark gap being electrically connected to the fuse on the interior of the housing, with the combined surge protection device also having an auxiliary fuse element that is connected electrically on one side to the first connector, and the auxiliary fuse element being connected on the other side via an ignition circuit, which is arranged on the interior of the housing, to the auxiliary ignition electrode, with the combined surge protection device having another connector in the region of the auxiliary fuse element that can be contacted at substantially the same potential to the first main electrode, so that, in the case of overloading, an electric arc forms between the auxiliary fuse element and the other connector, which leads to the triggering of the fuse.

2. The combined surge protection device as set forth in claim 1, wherein the housing is filled at least in sections in the region of the fuse with an extinguishing material, particularly selected from the group comprising sand and POM.

3. The combined surge protection device as set forth in claim 1, wherein at least parts of the housing make available the potential-equivalent connection of the other connector and of the first main electrode.

4. The combined surge protection device as set forth in claim 1, wherein the ignition circuit has a gas discharge tube and a varistor connected in series thereto.

5. The combined surge protection device as set forth in claim 1, wherein the other contact and the fuse element or the auxiliary fuse element are embodied such that independent ignition occurs over the intermediate space at a certain voltage, with the specified voltage being higher than the ignition voltage of the spark gap via the main electrodes.

6. The combined surge protection device as set forth in claim 1, wherein the auxiliary fuse element has a predetermined breaking point adjacent to the other connector.

7. The combined surge protection device as set forth in claim 1, wherein the spark gap also has a wear monitoring device within the spark gap, with the wear monitoring device also being connected to the ignition circuit.

8. The combined surge protection device as set forth in claim 1, wherein at least the spark gap is enclosed in a substantially pressure-resistant manner.

9. The combined surge protection device as set forth in claim 1, wherein at least the spark gap is enclosed in a substantially pressure-resistant manner and has a pressure equalization channel which enables pressure equalization within the housing.

10. The combined surge protection device as set forth in claim 1, wherein a contact means is also provided that can selectively connect the other connector and the auxiliary fuse element electrically in order to bring about an electric arc.

11. The combined surge protection device as set forth in claim 10, wherein the contact means can be triggered mechanically.

* * * * *